(12) United States Patent
Schwemmlein

(10) Patent No.: US 7,971,018 B2
(45) Date of Patent: Jun. 28, 2011

(54) METHOD AND APPARATUS FOR SECURE CONTEXT SWITCHING IN A SYSTEM INCLUDING A PROCESSOR AND CACHED VIRTUAL MEMORY

(75) Inventor: Joerg C. Schwemmlein, Sankt Ulrich am Waasen (AT)

(73) Assignee: MediaTek Inc., Hsin-Chu (TW)

( * ) Notice: Subject to any disclaimer, the term of this patent is extended or adjusted under 35 U.S.C. 154(b) by 187 days.

(21) Appl. No.: 11/799,392

(22) Filed: May 1, 2007

(65) Prior Publication Data
US 2007/0260838 A1    Nov. 8, 2007

Related U.S. Application Data

(60) Provisional application No. 60/796,433, filed on May 1, 2006.

(51) Int. Cl.
*G06F 12/00* (2006.01)
(52) U.S. Cl. .................................... 711/163; 712/229
(58) Field of Classification Search .................. 711/163; 713/164, 190; 712/229
See application file for complete search history.

(56) References Cited

U.S. PATENT DOCUMENTS

| 5,838,987 | A  | * | 11/1998 | Brightman et al. ............. 712/32 |
| 6,092,172 | A  | * | 7/2000  | Nishimoto et al. ........... 711/207 |
| 7,363,491 | B2 | * | 4/2008  | O'Connor ..................... 713/166 |
| 2003/0140245 | A1 | * | 7/2003 | Dahan et al. .................. 713/200 |
| 2004/0153672 | A1 | * | 8/2004 | Watt et al. .................... 713/201 |
| 2006/0005072 | A1 | * | 1/2006 | Philippe Conti et al. ......... 714/5 |
| 2006/0015749 | A1 | * | 1/2006 | Mittal ........................... 713/190 |
| 2007/0150693 | A1 | * | 6/2007 | Kaneko et al. ................ 711/202 |
| 2008/0072004 | A1 | * | 3/2008 | Kershaw ....................... 711/163 |

FOREIGN PATENT DOCUMENTS

| EP | 1331539 | 7/2003 |
| EP | 1612638 | 1/2006 |

* cited by examiner

*Primary Examiner* — Jared I Rutz
(74) *Attorney, Agent, or Firm* — Fish & Richardson P.C.

(57) ABSTRACT

A method and a secure mode controller are provided for controlling context switching between secure and user modes in a processing system including a processor and a memory management unit. The method comprises monitoring the memory management unit to detect a non-cache access to an entry point address that contains a secure mode entry instruction, verifying, in response to detection of the entry point address, that the secure mode entry point instruction is executed by the processor, and enabling context switching from the user mode to the secure mode in response to verifying that the secure mode entry instruction is executed by the processor. Each cache line of an instruction cache and a data cache may have a tag containing a secure bit to identify a secure cache line or a non-secure cache line.

20 Claims, 4 Drawing Sheets

METHOD AND APPARATUS FOR SECURE CONTEXT SWITCHING IN A SYSTEM INCLUDING A PROCESSOR AND CACHED VIRTUAL MEMORY

CROSS REFERENCE TO RELATED APPLICATION

This application claims priority based on Provisional Application Ser. No. 60/796,433, filed May 1, 2006, which is hereby incorporated by reference in its entirety.

FIELD OF THE INVENTION

This invention relates to secure context switching in systems which have a secure mode and a user mode. More particularly, the invention relates to methods and apparatus for secure context switching in a system including a processor and cached virtual memory, with little change to the processor and the memory system.

BACKGROUND OF THE INVENTION

A system-on-chip (SOC) may include a processor, e.g., a microcontroller (MCU), having data and instruction caches and virtual addressing capabilities. In some applications, the system-on-chip may require operation in a secure mode. In the case where the processor is an industry standard design, secure operation should be achieved with little change to the processor itself, thereby avoiding change to the programmer's model and ensuring binary compatibility.

Securing the processor under these conditions involves control of transitions between the user and secure modes. In the user mode, various secure resources and memory areas are not accessible. In the secure mode, the secure resources and memory areas can be accessed. Securing the processor under these conditions implies that protection states provided by the processor are deemed insufficient for the security requirement of the system.

Since the processor is considered to include instruction and data caches as well as a memory management unit to provide address translation, controlling the state transition also requires measures against misusing the address translation logic. The memory management unit, as well as the translation table entries in which virtual to physical mappings are configured, are considered as a non-secured resource.

Accordingly, there is a need for methods and apparatus to control context switching between user and secure modes in a processing system including a processor and a memory management unit.

SUMMARY OF THE INVENTION

According to a first aspect of the invention, a method is provided for controlling context switching between secure and user modes in a processing system including a processor and a memory management unit.

The method comprises monitoring the memory management unit to detect a non-cache access to an entry point address that contains a secure mode entry instruction, verifying, in response to detection of the entry point address, that the secure mode entry point instruction is executed by the processor, and enabling context switching from the user mode to the secure mode in response to verifying that the secure mode entry instruction is executed by the processor.

The processing system may further comprise an instruction cache, a data cache, or both. Each cache includes a plurality of cache lines, each having a tag containing a secure bit to identify a secure cache line or a non-secure cache line. The method may further comprise controlling access to a cache line of each cache in accordance with the mode of operation and the state of the secure bit in the accessed line of the cache.

According to a second aspect of the invention, a secure mode controller is provided to control context switching between a user mode and a secure mode in a processing system including a processor and a memory management unit. The secure mode controller comprises an address tracking unit configured to detect a non-cache access by the memory management unit to an entry point address that contains a secure mode entry instruction, and, in response to detection of the entry point address, to provide a verification that the secure mode entry instruction is executed by the processor, and a secure state machine configured to enable context switching from the user mode to the secure mode in response to verifying that the secure mode entry instruction is executed by the processor.

According to a third aspect of the invention, a method is provided for controlling context switching between user and secure modes in a processing system including a processor, a virtual memory management unit, an instruction cache and a data cache. The method comprises: defining an entry point address that contains a secure mode entry instruction; detecting the entry point address on a physical instruction address bus of the virtual memory management unit; storing a virtual entry point address that corresponds to the physical entry point address; comparing an execute stage address of the processor with the stored virtual entry point address; and if the execute stage address matches the virtual entry point address, enabling context switching from the user mode to the secure mode.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
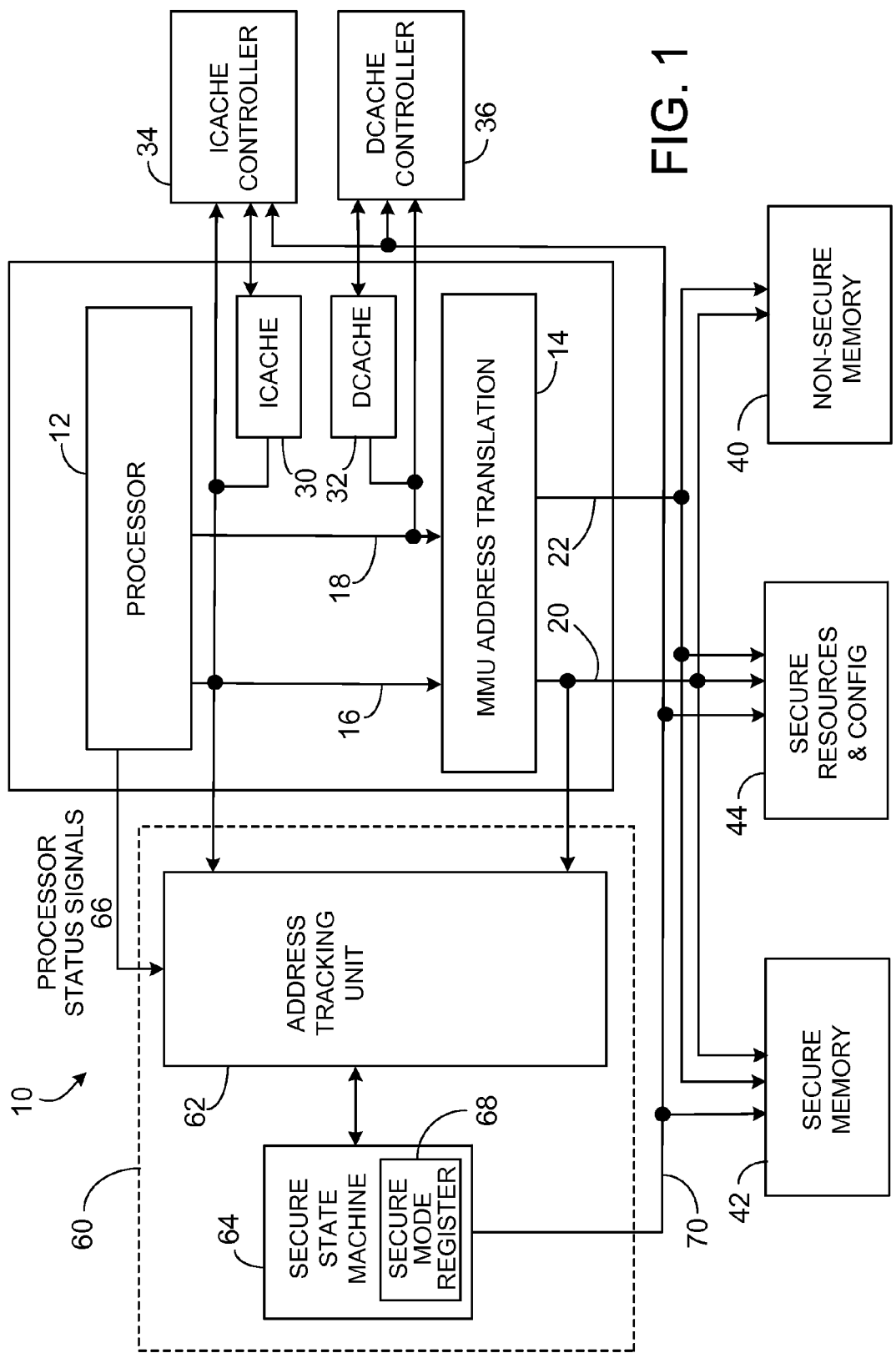
FIG. 1 is a block diagram of a system incorporating control of context switching between user and secure modes in accordance with an embodiment of the invention.

A processing system may be implemented on a single chip or integrated circuit and is commonly called a system-on-chip (SOC). The processing system may include a processor, an instruction cache, a data cache and a virtual memory management unit (MMU). The memory management unit may interface to a virtual instruction address bus, a virtual data address bus, a physical instruction address bus and a physical data address bus. The processing system may further include an on-chip memory, an external interface and other on-chip resources.

A physical address in the address space of the processing system, referred to as an "entry point address," is dedicated to serve as the entry point into a secure state. This entry point address may be anywhere in the processor memory space, with the assumption that its contents, a secure mode entry instruction, are either fixed in hardware (such as ROM) or cannot be changed by code executing in a user state. From a programmer's perspective, the secure state is entered whenever the instruction control flow of the processor is redirected to the entry point address. The secure state corresponds to a secure operating mode or secure mode, and the user state corresponds to a user operating mode or user mode (non-secure mode).

A transition to the secure mode can be controlled as follows. Whenever monitoring logic on the physical instruction address bus detects the entry point address, the corresponding virtual entry point address of the fetch stage of the processor is stored, and a valid flag for the address is set. In parallel, the virtual entry point address is supplied to a pipeline follower which produces a virtual instruction address of the execute stage of the processor. The execute stage address is compared with the stored virtual entry point address, taking the valid flag into account.

If the instruction stored at the entry point address advances through the processor pipeline and reaches the execute stage, the execute stage address from the pipeline follower matches the stored virtual entry point address. If the valid flag is also set at this point, the mode switch to the secure state or, alternatively, to some preceding privileged state such as an entry state is enabled. The pipeline follower may take additional information from the processor into account, such as an "instruction executed" flag. This guarantees that context switching to the secure state happens only if the secure mode entry instruction is executed by the processor.

After a transition from user mode to either secure mode or any preceding privileged state, the valid flag is automatically cleared. Such clearing of the valid flag may also be necessary if the processor is aborted or interrupted between the fetch and execute stage. Therefore, only an instruction access sequence which yields both the physical and the virtual address of the secure mode entry instruction triggers a state transition into secure mode. In the case where the instruction stream is cached, a state transition only happens if the cache line corresponding to the entry point address is fetched from memory. If the secure mode entry instruction is already present in the instruction cache, the state transition is blocked. This operation is based on the assumption that the memory management unit and the translation tables are non-secured resources. Thus, it is possible for non-secured code to either preset a cache line corresponding to any virtual address, such as the entry point address, or redirect a stored entry point address to a non-secured physical address.

Referring now to FIG. 1, a block diagram of a processing system 10 in accordance with an embodiment of the invention is shown. Processing system 10 includes a core processor 12 coupled to a memory management unit (MMU) 14 by a virtual instruction address bus 16 and virtual data address bus 18. Core processor 12 may be a microcontroller (MCU), a microprocessor, or any other digital processor. The memory management unit 14 may include virtual-to-physical address translation tables when virtual addressing is used. The memory management unit 14 output is coupled to a physical instruction address bus 20 and a physical data address bus 22. In embodiments which do not use virtual addressing, memory management unit 14 may be a conventional memory controller.

The processing system 10 further includes an instruction cache (I cache) 30 coupled to virtual instruction address bus 16 and a data cache (D cache) 32 coupled to virtual data address bus 18. As known in the art, instruction cache 30 and data cache 32 are relatively small, high-speed memories which take advantage of the spatial and/or temporal locality that is frequently characteristic of memory access patterns to enhance processor performance. An instruction cache controller 34 controls instruction cache 30, and a data cache controller 36 controls data cache 32. Instruction cache 30, instruction cache controller 34, data cache 32 and data cache controller 36 may be modified in accordance with aspects of the invention as described below.

Memory management unit 14 receives a virtual instruction address on virtual instruction address bus 16 and outputs a physical instruction address on physical instruction address bus 20. Memory management unit 14 also receives a virtual data address on virtual data address bus 18 and outputs a physical data address on physical data address bus 22. Physical instruction address bus 20 and physical data address bus 22 are coupled to non-secure (user) memory 40, secure memory 42 and secure resources 44. Non-secure memory 40 and secure memory 42 may be different memories or may be different areas of the same memory. The secure memory 42 and the secure resources 44 are on-chip components of the processing system 10. Non-secure memory 40 may be on-chip, off-chip, or a combination of on-chip and off-chip. In some embodiments, secure memory 42 is a specified memory address space, which is a subset of the memory address space of the processor.

The processing system 10 further includes a secure mode controller 60 to control context switching between the user mode and the secure mode. The secure mode controller 60 includes an address tracking unit 62 which monitors operation of core processor 12 and memory management unit 14 as described below, and a secure state machine 64 which defines the operating mode of the processing system. Address tracking unit 62 monitors virtual instruction address bus 16 and physical instruction address bus 20 and receives from processor 12 processor status signals which permit monitoring of pipeline operation in processor 12. Secure state machine 64 includes a secure mode register 68 that contains the current operating mode of processing system 10. A secure mode output 70 of secure state machine 64 permits access to secure memory 42 and to secure resources 44 and controls access to instruction cache 30 and data cache 32 as described below. Secure mode controller 60 further includes one or more configuration registers (not shown) which define operating parameters of the secure mode controller 60.

To permit efficient access to instruction cache 30 and data cache 32 in secure and user modes, a tag extension is provided in each cache line of instruction cache 30 and data cache 32. The tag extension indicates whether the cache line is secure or non-secure and is used in the operation of each cache. Operation of the tag extension is described below.

Figure 2:
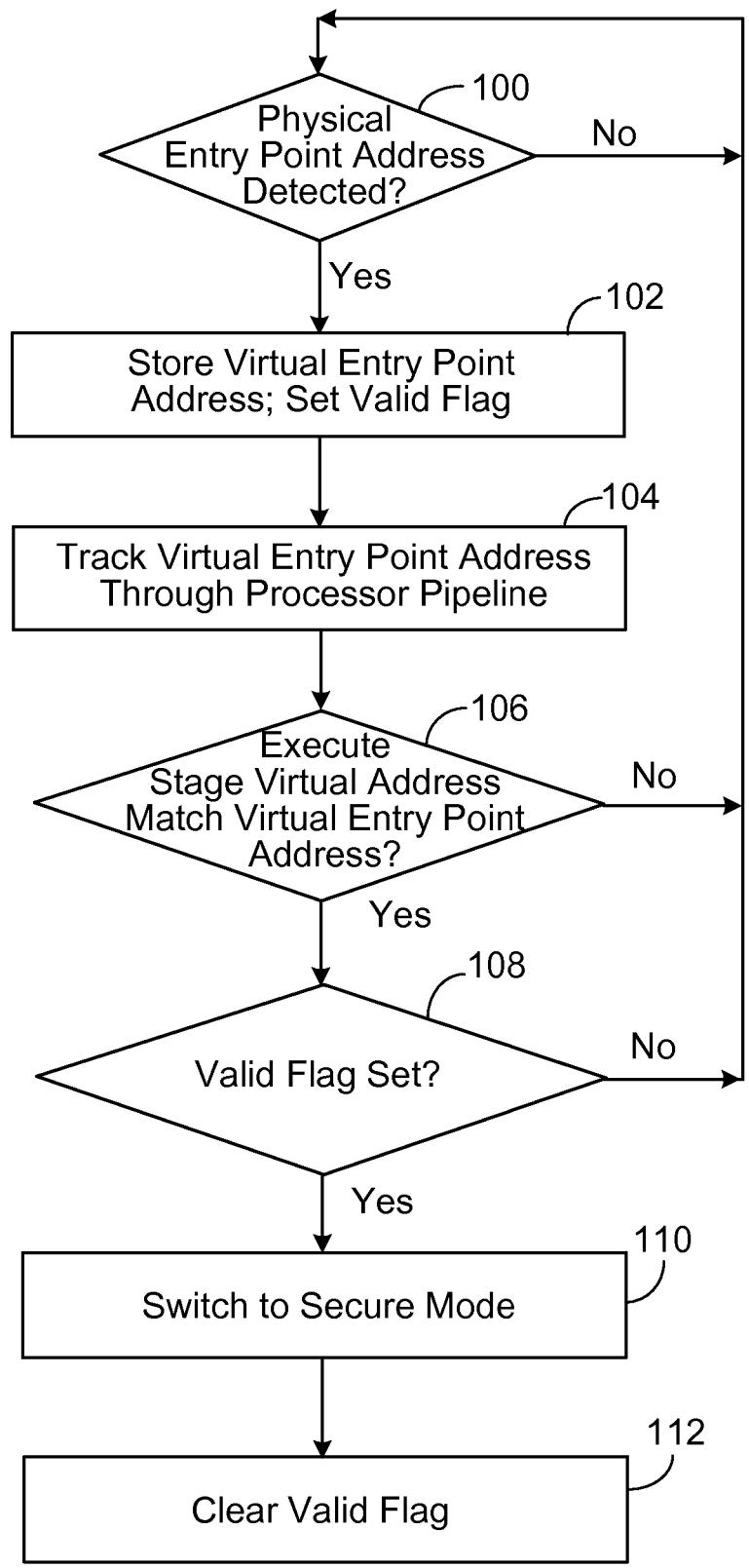
FIG. 2 is a flow chart of a process for controlling context switching between a user mode and a secure mode in accordance with an embodiment of the invention.

A flow chart of operations performed by secure mode controller 60 in accordance with an embodiment of the invention is shown in FIG. 2. As described above, an entry point address is assigned as the address of a secure mode entry instruction. Detection of the entry point address on physical instruction address bus 20 indicates an attempt to enter the secure mode. In step 100, address tracking unit 62 monitors physical instruction address bus 20. When the physical entry point address is detected on address bus 20, the corresponding virtual entry point address is detected on virtual instruction address bus 16 and the virtual entry point address is stored in step 102. Thus, the virtual entry point address that corresponds to the physical entry point address is known. In addition, a valid flag associated with the virtual entry point address is set in step 102. In step 104, the virtual entry point address is tracked through the pipeline of processor 12, by monitoring processor status lines. Depending on the depth of the processor pipeline and any pipeline stalls that may occur, it can be determined when the virtual entry point address should reach the execute stage of the pipeline. In step 106, the execute stage address is compared with the stored virtual entry point address. If the addresses match, the valid flag is tested in step 108. If the valid flag is also set, context switching to the secure mode is enabled in step 110, and the valid flag is cleared in step 112.

The embodiment of FIG. 2 requires: (1) a non-cache access to the entry point address in memory via physical instruction address bus 20, and (2) that the processor 12 actually execute the secure mode entry instruction at the entry point address. Thus, context switching to the secure mode is blocked in step 100 if the secure mode entry instruction is in instruction cache 30 and the entry point address is not detected on physical instruction address bus 20. Further, context switching to the secure mode is blocked if the execute stage address does not match the stored virtual entry point address (step 106) or if the valid flag is not set (step 108) when the secure mode entry instruction reaches the execute stage of the processor.

Figure 3:
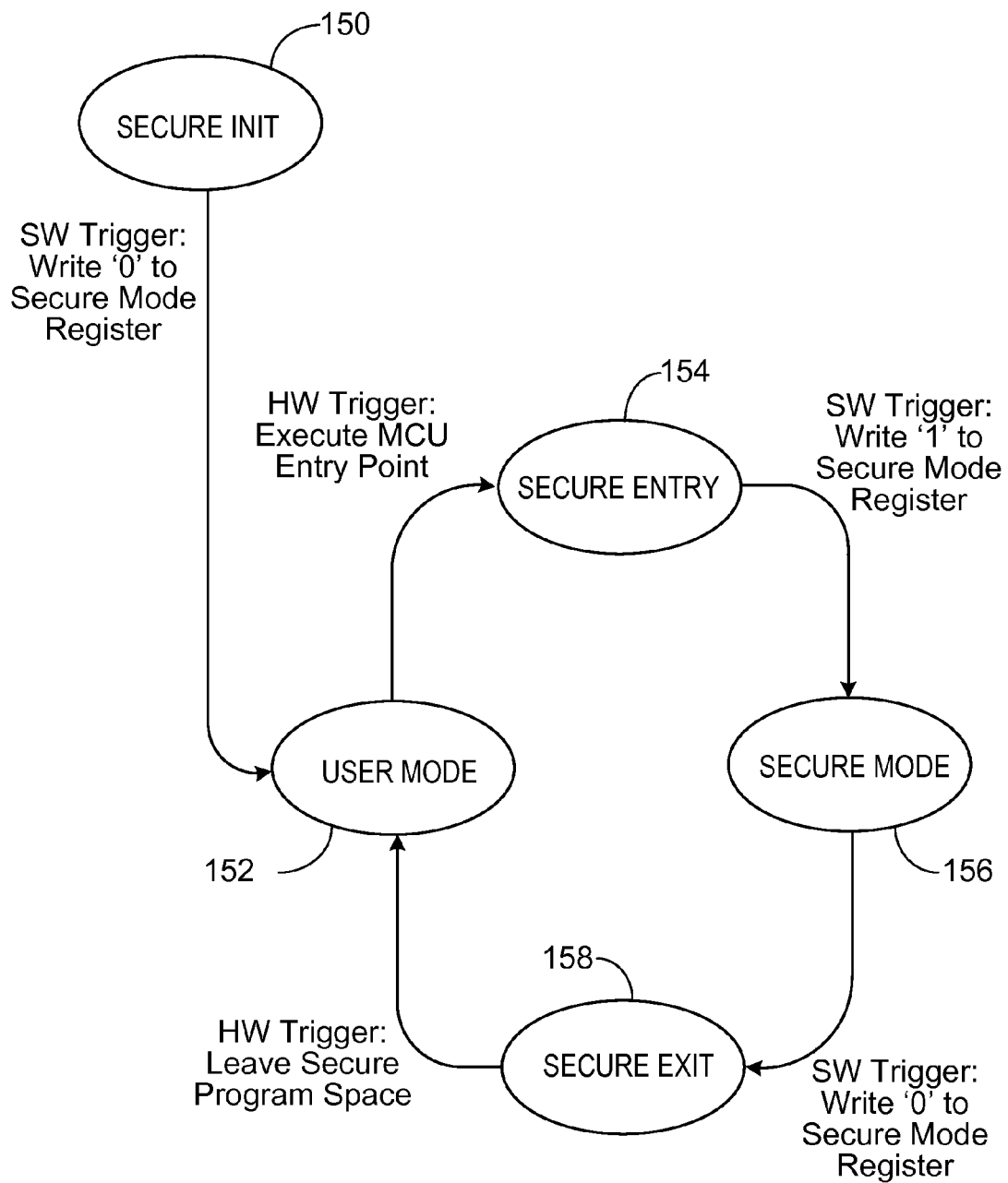
FIG. 3 is a state diagram that illustrates states of the secure state machine of FIG. 1.

The states of secure state machine 64 are shown in FIG. 3. The current state defines access privileges for the running code. State transitions are triggered either by: (1) authenticated code writing to the secure mode register 68, or (2) secure mode controller 60 identifying processor instruction flow into and out of secure program space, as described above. The combined hardware/software approach of triggering allows the security entry handler to examine system integrity before enabling the secure mode.

After successful authentication, the boot-ROM turns over control of the boot process with secure initialization privileges. This code is responsible for initializing the secure system and thus has privileges to configure the secure profile and to access any on-chip secrets.

Referring to FIG. 3, the access profile for each state from the processor perspective are described. In a secure initialization state 150, all of internal system RAM is available without restriction. All protected data entries, which may include fuses or other devices to store private data, are accessible. Secure configuration registers and the secure mode register 68 are write accessible. The secure mode controller 60 is disabled and processor instructions are not tracked. Writing a "zero" to the secure mode register 68 transitions to user mode 152.

In user mode 152, any protected entries are not accessible. The secure system RAM segment is not accessible if a secure RAM segment has been configured. Secure configuration registers and the secure mode register 68 are read only. An entry page of the secure program space is readable and executable. The secure mode controller 60 can enable a context switch to secure mode if the secure mode entry instruction is executed. If configured, any processor access to cache hits only on non-secure tagged entries. A security violation may trigger an exception or a reset.

The secure mode entry state 154 is the same as user mode, but the secure mode register 68 is write accessible. If configured, any processor instruction access to cache only hits on secure tagged entries. Writing a "one" to the secure mode register 68 enables the secure mode.

In secure mode 156, all of internal system RAM is available. All protected entries are accessible. Secure configuration registers and the secure mode register 68 are write accessible. Secure program memory may be rewritten only if explicitly enabled as write accessible. A write protection violation may trigger an exception or a reset. Executing code outside the secure program space may trigger an exception or a reset. If configured, any processor access to cache only hits on secure tagged entries. Writing a "zero" to the secure mode register 68 transitions to secure exit state 158.

In secure exit state 158, the processor has the same privileges as in user mode 152 and cannot access secure memory. The state machine switches to user mode 152 if code outside secure program memory is executed.

Figure 4:
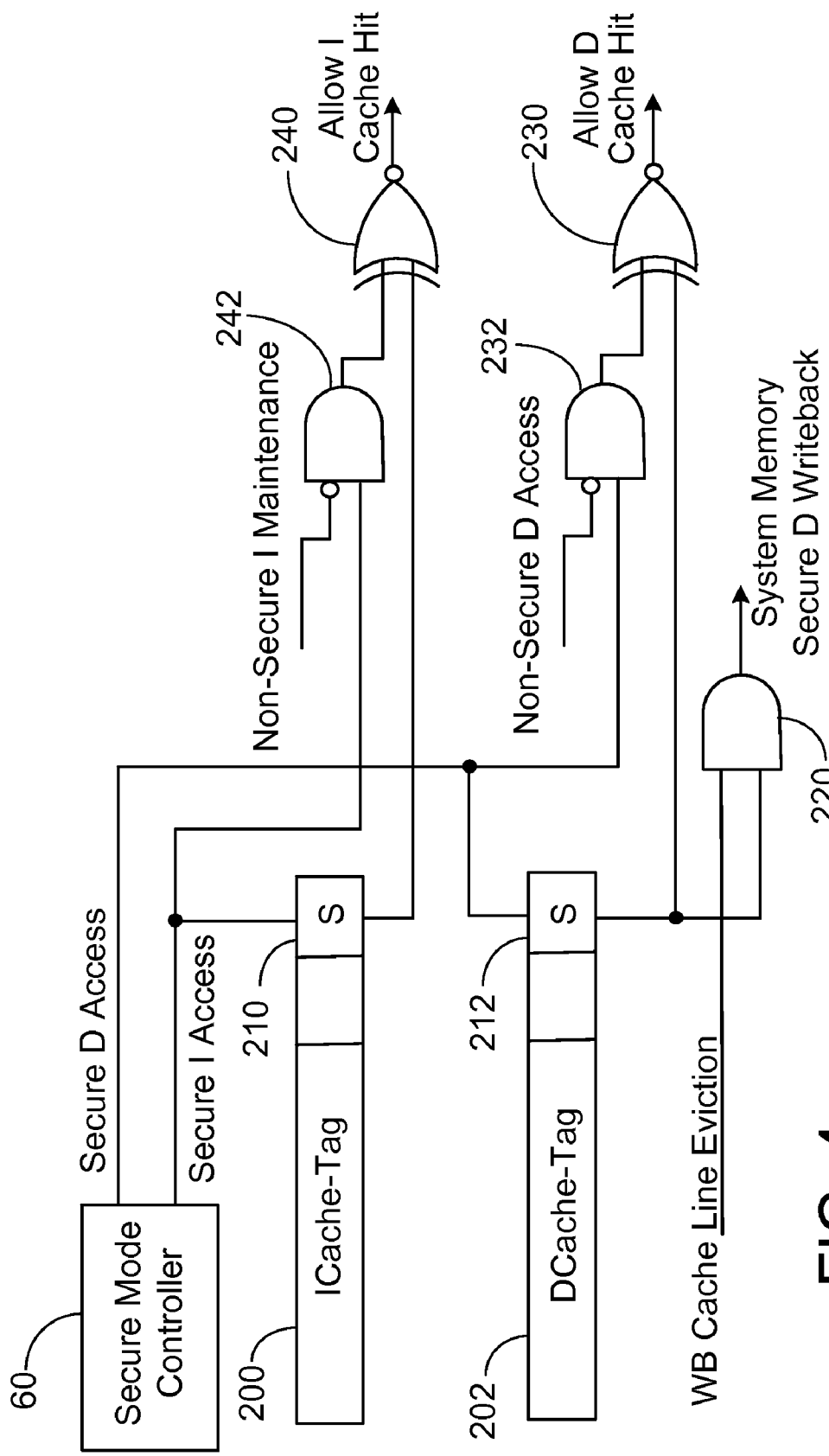
FIG. 4 is a schematic block diagram of logic for controlling cache access in accordance with an embodiment of the invention.

As indicated above, the instruction cache 30 and the data cache 32 may be configured for efficient operation in the user mode and the secure mode. As is conventional, each cache line includes a tag and data. FIG. 4 schematically shows a single tag 200 of instruction cache 30 and a single tag 202 of data cache 32. It will be understood that each cache includes multiple cache lines, with the number depending on the cache capacity. As shown in FIG. 4, the instruction cache tag 200 includes a secure bit 210, and the data cache tag 202 includes a secure bit 212. The secure bits 210 and 212 identify each cache line in the respective caches as secure or non-secure. The secure bit in a particular line of instruction cache 30 or data cache 32 can be set on a line fill operation in secure mode. A line fill operation in user mode does not set the secure bit. The secure bit is used during operation in the user mode and the secure mode to determine whether access is permitted to the cache line.

In user mode, processor 12 can access any cache line in instruction cache 30 or data cache 32 where the secure bit is cleared, but access to a cache line with the secure bit set is blocked. In the case of a cache miss in user mode, a cache line with the secure bit cleared can be replaced with another non-secure cache line. In user mode, a secure cache line having its "dirty" bit set can be written to the secure memory space, even though the cache line cannot be read in the user mode. The dirty bit indicates that the cache line has been modified.

In secure mode, processor 12 can access any cache line in instruction cache 30 or data cache 32 where the secure bit is set. On a cache miss, a cache line is replaced with another cache line from memory, and the secure bit is set. The cache line that is replaced may be a secure cache line or a non-secure cache line. In secure mode, processor 12 is blocked from accessing any non-secure cache line in instruction cache 30. Thus, processor 12 cannot access a non-secure instruction. Access to non-secure data depends on the configuration of the secure mode controller 60. In one embodiment, processor 12 is blocked from accessing non-secure data in data cache 32. In another embodiment, processor 12 is permitted to access non-secure data in data cache 32 and the secure bit is not set in the corresponding data cache 32 line. In this embodiment, the secure bit in data cache 32 is effectively ignored in secure mode.

Referring again to FIG. 4, a logic gate 220 permits writeback of a secure data cache line to the secure memory space in the user mode, based on a WB Cache Line Eviction signal. Logic gates 230 and 232 permit the secure bit to be overridden for a non-secure data access in the secure mode, in response to a Non-Secure D-access signal. Logic gates 240 and 242 permit the secure bit in the instruction cache 30 to be overridden during non-secure maintenance operations by processor 12, in response to a Non-Secure I Maintenance signal.

If the instruction stream is cached, the state transition to the secure mode is controlled during the initial cache line fill corresponding to the entry point address by the process described above. All following instruction cache hits take the secure state into account and will yield only instruction cache lines previously fetched in the secure state. Thus, it is not possible for non-secure user code to preset cache lines following the entry point cache line to be successfully executed in the secure state.

Once in the secure mode, all instruction or data cache accesses take the secure state into account. This means that on a cache miss, a cache line is tagged as secure and only secure cache lines produce a cache hit. Since this preserves the integrity and confidentiality of cache data fetched in the secure state, cache maintenance operations are not required on context switches between secure and non-secure states. This improves the performance of applications requiring such integrity and confidentiality.

If data is cached, the secure mode defines the additional hit criteria for the cache logic. The hit criteria is not based on an address map on top of the secure state, which would require modifying the memory management unit 14. This means that a mechanism for importing data into the secure state is required to avoid cache maintenance operations such as flushing cache lines or the complete data cache, which would result in a performance loss. The mechanism is that a configuration control bit allows overwriting the secure state on a cached data access.

After leaving the secure mode, code starting at the entry point address may still reside in the instruction cache in a cached configuration. As a consequence, reentry into the secure state cannot be obtained without additional measures. In particular, an additional control bit allows overwriting the secure state for instruction cache maintenance operations. Thus, code following the entry point is enabled to execute a cache maintenance operation which flushes the entry point cache line.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for controlling context switching between secure and user modes in a processing system including a processor and a memory management unit, comprising:
    monitoring the memory management unit to detect a non-cache access to a physical entry point address that contains a secure mode entry instruction;
    prior to executing the secure mode entry instruction, detecting a virtual entry point address at a fetch stage of the processor, the virtual entry point address corresponding to the physical entry point address, and storing the virtual entry point address;
    verifying that the secure mode entry instruction is executed by the processor, including determining if a virtual address at an execute stage of the processor matches the stored virtual entry point address; and
    enabling context switching from the user mode to the secure mode in response to verifying that the secure mode entry instruction is executed by the processor.

2. A method as defined in claim 1, further comprising setting a valid bit in response to detection of the physical entry point address on a physical instruction address bus and determining if the valid bit is set when the secure mode entry instruction is executed by the processor.

3. A method as defined in claim 1, wherein the processing system further comprises an instruction cache including a plurality of cache lines, each having a tag containing a secure bit to identify a secure cache line or a non-secure cache line, further comprising controlling access to a cache line of the instruction cache in accordance with the mode of operation and the state of the secure bit in the accessed line of the instruction cache.

4. A method as defined in claim 1, wherein the processing system further comprises a data cache including a plurality of cache lines, each having a tag containing a secure bit to identify a secure cache line or a non-secure cache line, further comprising controlling access to a cache line of the data cache in accordance with the mode of operation and the state of the secure bit in the accessed line of the data cache.

5. A method as defined in claim 4, further comprising writing a secure cache line of the data cache to secure memory space in the user mode in response to a cache miss in the data cache.

6. The method of claim 1 in which the memory management unit comprises a virtual memory management unit having a virtual instruction address bus and a physical instruction address bus, and monitoring the memory management unit comprises detecting the entry point address on the physical instruction address bus.

7. The method of claim 1 in which verifying that the secure mode entry instruction is executed by the processor includes determining when the virtual entry point address should reach the execute stage of the processor, and determining, at the time when the virtual entry point address should reach the execute stage of the processor, if the virtual address at the execute stage of the processor matches the stored virtual entry point address.

8. A secure mode controller to control context switching between a user mode and a secure mode in a processing system including a processor and a memory management unit (MMU), the secure mode controller comprising:
    an address tracking unit configured to detect a non-cache access by the memory management unit to a physical entry point address that contains a secure mode entry instruction, including prior to executing the secure mode entry instruction, detecting a virtual entry point address at a fetch stage of a pipeline of the processor, the virtual entry point address corresponding to the physical entry point address, and storing the virtual entry point address, and, in response to detection of the physical entry point address, to verify that the secure mode entry instruction is executed by the processor, including determining if a virtual address at an execute stage of the processor matches the stored virtual entry point address; and
    a secure state machine configured to enable context switching from the user mode to the secure mode in response to verifying that the secure mode entry instruction is executed by the processor.

9. A secure mode controller as defined in claim 8, wherein the address tracking unit is configured to set a valid bit in response to detection of the physical entry point address on a physical instruction address bus and to determine if the valid bit is set when the secure mode entry instruction is executed by the processor.

10. A secure mode controller as defined in claim 8, wherein the processing system further comprises an instruction cache including a plurality of cache lines, each having a tag containing a secure bit to identify a secure cache line or a non-secure cache line, further comprising an instruction cache controller to control access to a cache line of the instruction cache in accordance with the mode of operation and the state of the secure bit in the accessed line of the instruction cache.

11. A secure mode controller as defined in claim 8, wherein the processing system further comprises a data cache including a plurality of cache lines, each having a tag containing a secure bit to identify a secure cache line or a non-secure cache line, further comprising a data cache controller to control access to a cache line of the data cache in accordance with the mode of operation and the state of the secure bit in the accessed line of the data cache.

12. A secure mode controller as defined in claim 11, wherein the data cache controller enables writeback of a secure cache line to secure memory space in the user mode in response to a cache miss in the user mode.

13. The secure mode controller of claim 8 in which the memory management unit comprises a virtual memory management unit having a virtual instruction address bus and a physical instruction address bus, and monitoring the memory management unit comprises detecting the entry point address on the physical instruction address bus.

14. The secure mode controller of claim 8 in which the address tracking unit is configured to determine when the virtual entry point address should reach the execute stage of the processor, and determining, at the time when the virtual entry point address should reach the execute stage of the processor, if the virtual address at the execute stage of the processor matches the stored virtual entry point address.

15. A method for controlling context switching between user and secure modes in a processing system including a processor, a virtual memory management unit, an instruction cache and a data cache, comprising:
 defining an entry point address that contains a secure mode entry instruction;
 detecting the entry point address on a physical instruction address bus of the virtual memory management unit;
 prior to executing the secure mode entry instruction, detecting a virtual entry point address at a fetch stage of the processor, the virtual entry point address corresponding to the physical entry point address, and storing the virtual entry point address;
 comparing a virtual address at an execute stage of the processor with the stored virtual entry point address; and
 if the virtual address at the execute stage matches the virtual entry point address, enabling context switching from the user mode to the secure mode.

16. A method as defined in claim 15, further comprising setting a valid bit in response to detection of the entry point address on the physical instruction address bus and determining if the valid bit is set when the secure mode entry instruction is executed by the processor.

17. A method as defined in claim 15, wherein the instruction cache includes a plurality of cache lines, each having a tag containing a secure bit to identify a secure cache line or a non-secure cache line, further comprising controlling access to a cache line of the instruction cache in accordance with the mode of operation and the state of the secure bit in the accessed line of the instruction cache.

18. A method as defined in claim 15, wherein the data cache includes a plurality of cache lines, each having a tag containing a secure bit to identify a secure cache line or a non-secure cache line, further comprising controlling access to a cache line of the data cache in accordance with the mode of operation and the state of the secure bit in the accessed line of the data cache.

19. The method of claim 15, comprising determining when the virtual entry point address should reach the execute stage of the processor, and determining, at the time when the virtual entry point address should reach the execute stage of the processor, if the virtual address at the execute stage of the processor matches the stored virtual entry point address.

20. The method of claim 15, comprising setting a valid flag at the fetch stage when the entry point address is detected on the physical instruction address bus, and enabling context switching from the user mode to the secure mode at the execute stage if the valid flag remains set, and not enabling context switching from the user mode to the secure mode if, at the execute stage, the valid flag is not set.

* * * * *